United States Patent [19]

Kryder

[11] Patent Number: 4,670,316
[45] Date of Patent: Jun. 2, 1987

[54] THERMO-MAGNETIC RECORDING MATERIALS SUPPORTING SMALL STABLE DOMAINS

[75] Inventor: Mark H. Kryder, Bradford Woods, Pa.

[73] Assignee: General Electric Company, Schenectady, N.Y.

[21] Appl. No.: 702,166

[22] Filed: Feb. 15, 1985

Related U.S. Application Data

[63] Continuation of Ser. No. 493,495, May 11, 1983, abandoned.

[51] Int. Cl.$^4$ .................................... G11B 5/64
[52] U.S. Cl. ................................ 428/64; 365/122; 428/216; 428/336; 428/693; 428/900; 428/65
[58] Field of Search ............... 428/64, 65, 692, 693, 428/694, 900, 336, 216; 427/129, 128; 365/122, DIG. 33; 360/59

[56] References Cited

U.S. PATENT DOCUMENTS

| | | | |
|---|---|---|---|
| 3,965,463 | 6/1976 | Chaudhari et al. | 340/174 TF |
| 4,152,178 | 5/1979 | Malekzadeh et al. | 148/130 |
| 4,170,689 | 10/1979 | Katsui et al. | 428/457 |
| 4,367,257 | 1/1983 | Arai | 428/693 |
| 4,390,600 | 6/1983 | Ohta et al. | 428/621 |
| 4,414,290 | 11/1983 | Breed | 428/693 |
| 4,586,161 | 4/1986 | Skoda | 428/900 |

OTHER PUBLICATIONS

"Growth Induced Anisotropy in Sputtered GdCo Films", Esho et al., *AIP Conf Proc.*, 34, 331–333 (1976).
"Different Origin of the Perpendicular Anisotropy in Amorphous Gd–Fe from Gd–Co Films", Katayama et al., *IEEE Trans. Mag.*, (MAG 13) No. 5, pp. 1603–1605 (Sep. 1977).

*Primary Examiner*—Ellis P. Robinson
*Attorney, Agent, or Firm*—Geoffrey H. Krauss; James C. Davis, Jr.; Marvin Snyder

[57] ABSTRACT

Amorphous alloys of two materials having antiferromagnetically-coupled magnetization sublattices, and capable of deposition as a thin film supporting small stable domains for thermo-magnetic recording. The thin-film material is an alloy of at least one rare-earth element and a transistion-metal element. A stable domain of a few microns diameter, allowing highest density of information recording, is achieved by providing the lowest possible wall energy to the domain, with a resulting low anisotropy.

15 Claims, 2 Drawing Figures

SUPPORTING SMALL STABLE DOMAINS

This application is a continuation Ser. No. 493,495 filed May 11, 1983 now abandoned.

BACKGROUND OF THE INVENTION

The present invention relates to information storage and, more particularly, to novel materials supporting small stable magnetic domains for the thermo-magnetic recording of information therein.

It is known to store data by magnetically recording each bit of data in a magnetic medium. To obtain the highest density of stored information, the area of each magnetic domain must be as small as possible. It has previously been recognized to utilize materials having high coercivity to support magnetic domains having diameters on the order of several micrometers. Such materials are typically deposited by processes such as R.F. sputtering, wherein R.F. biases in the range from about 60 volts to about 200 volts are utilized.

It is desirable to provide materials which support relatively small and stable magnetic domains for thermo-magnetic recording.

BRIEF DESCRIPTION OF THE INVENTION

In accordance with the invention, a thin-film layer of magnetic material is provided for thermo-magnetic recording. The magnetic material is an alloy of either at least one rare-earth element and at least one transition metal, or one of manganese bismuth (MnBi), manganese aluminum germanium (MnAlGe), manganese copper bismuth (MnCuBi) or platinum cobalt (PtCo) The magnetic recording materials have magnetic anisotropy and relatively low domain wall energy with high coercivity.

In presently preferred embodiments, rare-earth/transition-metal alloys, such as gadolinium cobalt (GdCo), gadolinium terbium cobalt (GdTbCo), gadolinium terbium iron (GdTbFe), terbium iron (TbFe), dysprosium iron (DyFe) and gadolinium iron yttrium (GdFeY) materials are formed as thin films of amorphous alloys, which thin films are deposited by R.F. sputtering. An R.F. bias of less than about 60 volts or greater than about 200 volts is utilized to provide a magnetic recording material alloy which will support smaller domains than materials prepared under moderate bias conditions.

Accordingly, it is an object of the present invention to provide novel amorphous alloys for thermo-magnetic recording.

This and other objects of the present invention will become apparent upon consideration of the following detailed description, when read in conjunction with the drawings.

DETAILED DESCRIPTION OF THE INVENTION

Figure 1:
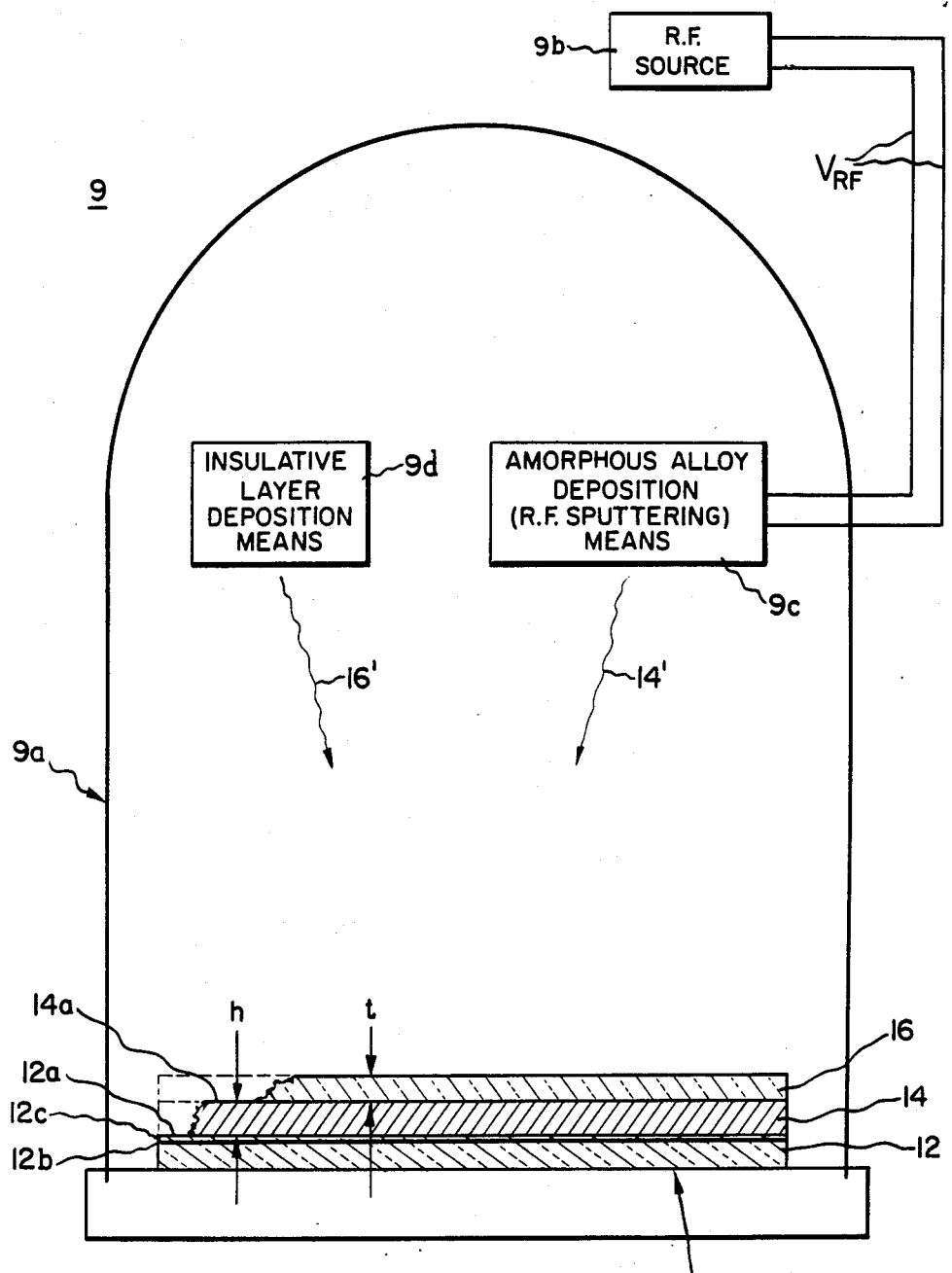
FIG. 1 is a somewhat schematic representation of apparatus for deposition of the amorphous alloys, in accordance with the principles of the present invention, upon a thermo-magnetic recording disk.

Information recording may be achieved by causing a local increase in the temperature of a thin-film layer of magnetic recording material, to cause the magnetization direction in that heated area to change responsive to the direction of a local magnetic field. I have found a class of amorphous alloys, specifically amorphous alloys having at least one transition-metal element and at least one rare-earth element, in which at least two antiferromagnetically-coupled magnetization sublattices can be made opposite and equal at some compensation temperature such that the net magnetization goes to zero. These materials exhibit a coercive force which tends toward infinity at the compensation point and decreases monotonically as the temperature increases above that compensation temperature. By heating materials of this class of amorphous alloys to temperatures well above their compensation temperatures in the presence of a small magnetic field, the magnetization of the heated region is caused to assume the direction of the applied field; after the heated region cools, the magnetic parameters of my novel materials are such that a magnetic domain is created which is stable and neither expands nor collapses.

It has been generally recognized that increases in the magnetic coercive force of a thin-film magnetic material will improve the stability of magnetic domains in that material. However, it has frequently been found that there is inadequate coercivity to stabilize relatively small domains, having diameters no larger than several micrometers. Thus, although the desired magnetic domains may form while the desired domain volume of material is heated, the desired domains tend to collapse when the material cools. It is known that it is possible to form stable reverse domains of diameters less than several micrometerss in materials with a zero or very small coercivity, if the recording layer material has, in the presence of a stabilizing bias field, the correct values of magnetic anisotropy, magnetization and exchange energy constant Such materials will support bubble domains with dimensions down to a specific critical, or collapse, diameter which is dependent upon the film thickness, exchange energy constant, magnetization and magnetic anisotropy values. These reverse domains can be formed dynamically in the material, but will collapse when the stabilizing bias field is removed.

My thermo-magnetic recording materials allow domains to be formed with very small dimensions, which are stable without a bias field, to allow storage of large amounts of information. In such thermo-magnetic recording material, it is not only desirable to have high coercivity, but it is also desirable to have the ability to choose the other magnetic parameters such that the collapse diameter of domains formed in the recording material is very small. If suitable selection of the other magnetic parameters is made, somewhat lower coercivity values can be utilized and still provide stable domains.

It is known that the equilibrium diameter of a domain can be determined from the equation:

$$(1/h)+(H/4\pi M)(d/h)-F(d/h)=0 \qquad (1)$$

where h is the film thickness, H is the magnetic field applied perpendicular to the film plane, M is the magnetization of the material, d is the domain diameter, F(d/h) is a force function (the computed tabulations of which are known to those skilled in the art) and l is the characteristic length, itself defined by $$l = \sigma_w/(4\pi M^2) = (\sqrt{AK_u})/(\pi M^2) = \sqrt{2\pi AQ}/\pi M \quad (2)$$

where $\sigma_w$ is the domain wall energy per unit area, A is the exchange constant, $K_u$ is the uniaxial anisotropy constant and $Q = K_u/2\pi M^2$. That is, the first term $(1/h)$ of equation (1) is the normalized force per unit area on the domain wall (surrounding the reverse domain) which is produced by domain wall energy. This normalized force acts like a surface tension; a larger domain has more domain wall and has a higher domain wall energy. Therefore, this term represents a compressive force causing the domain to shrink The second term $(H/4\pi M)(d/h)$ of equation (1) is the normalized force per unit area on the domain wall, due to the application of a magnetic field H anti-parallel to the domain magnetization; this normalized force is a compressive force also acting to shrink the domain. The third term $(F(d/h))$ of equation (1) is the normalized force per unit area due to the magnetostatic demagnitizing energy of the material and is a positive function; this normalizing force per unit area acts to enlarge the domain. When the three forces balance, equilibrium is achieved and the resulting domain is stable.

The coercive force $H_c$ of the magnetic material acts to provide the required stability in thermo-magnetic recording alloys; in contradistinction, in magnetic bubble applications, the domain stability must be responsive to the applied H field. Because the coercive force $H_c$ always acts to oppose domain wall motion (and for a small domain with dimensions smaller than the critical collapse diameter will act to prevent collapse) equation (1) can be modified to include coercive force effects, as follows:

$$(1/h) + ((H - H_c)(d/h)/(4\pi M)) - F(d/h) = 0. \quad (3)$$

I have utilized the foregoing equation (3), and equation (2) for the characteristic length, to find that:

$$H_c - H = (4\sqrt{2\pi AQ} - (4\pi M)(h/d)F(d/h). \quad (4)$$

I have chosen to make the thickness h of my recording material film small compared to the domain diameter d for thermo-magnetic recording applications. Therefore, $$F(d/h) \simeq d/h \quad (5)$$

and $$H_c - H \simeq ((4\sqrt{2AQ})/d) - (4\pi M). \quad (6)$$

In order to achieve adequate coercivity near room temperature, my materials for thermo-magnetic recording have a compensation point near room temperature and a relatively low magnetization M. Thus, $$H_c - H \simeq 4\sqrt{2\pi AQ}/d \quad (7)$$

and, with zero applied field H, $$d \simeq 4\sqrt{2\pi AQ}/H_c. \quad (8)$$

Therefore, I have found that in order to obtain the smallest possible diameter d of a stable domain in a material, the coercive force $H_c$ should be large and the exchange constant A and quantity Q of the material must be reduced to as low a value as practical. In practice, it is often undesirable to reduce the value of the exchange constant A, as such reduction implies a reduced Curie temperature and generally restricts the temperature-use range of the resultant recording alloy film. Further, reductions in exchange constant A may be accompanied by a reduction in the magneto-optical coefficients, which produce a lower signal-to-noise ratio during magneto-optical readout. Further, it is also undesirable to use materials with extremely large values of coercive force, since higher-coercive-force materials require larger energies, e.g from a laser pulse and the like, to write a domain. In accordance with one aspect of my invention, my amorphous alloy recording thin-films are formed of a material having minimum Q, so that materials with moderate coercivity and moderate exchange constant A, can be used. In order that the materials have perpendicular magnetization, Q must be greater than, or equal to, 1; materials described herein have $1 \leq Q \leq 2$. These thermo-magnetic recording alloy materials all allow operation over an extended temperature range and still provide adequate magneto-optical signal-to-noise ratios The recording thin-film layer is, in several presently preferred embodiments, formed of an amorphous alloy of at least one rare-earth element and at least one transition-metal element. These materials are prepared with low anisotropy and high coercivity by depositing the film by the present preferred R.F. sputtering process, with either very small R.F. bias, of less than about 60 volts amplitude, or with very large R.F. bias, typically greater than about 200 volts, during the sputtering deposition. Films of amorphous alloys such as gadolinum cobalt (GdCo) and gadolinum terbium cobalt (GdTbCo) are presently preferred, with films of gadolinum terbium iron (GdTbFe), terbium iron (TbFe) and the like being potentially useful in certain applications. The transition metal utilized may be any of the Group VIII metals, preferably of the fourth period for reducing recording material costs. The rare-earth elements of the sixth period may be utilizable, and the elements having hexagonal crystal structure are presently preferred Amorphous alloys of the rare-earth/transition-metal elements, deposited with very small or very large R.F. bias, support thermo-magnetic storage domains having diameters on the order of 0.5 to 3 micrometers, with high coercive force (of about 500–1500 Oersteds); films prepared utilizing typical moderate bias conditions (between about 60 volts and about 200 volts) do not appear to support domains of such small diameter, as the low anisotropy provided by very small or very large bias amplitudes is not present and, indeed, has apparently been unrecognized prior to my invention.

Referring now to FIG. 1, a recording disk 11 is fabricated by placing a thin disk substrate 12, which may, but need not, be of a non-magnetic material, such as glass, ceramic, plastic and the like, in the isolation means 9a, e.g. a vacuum chamber, of a deposition means 9. The substrate 12 can also be of the type having, on surface 12a, a reflective coating 12b and subsequently overlaid with a thin layer 12c of a protective material, such as silicon dioxide and the like. Deposition means 9 is of any type known to the art as suitable for depositing a thin layer 14 of the recording medium upon the disk substrate surface 12a; illustratively, for depositing a layer 14 of GdCo recording media, an R.F. sputtering means 9c is utilized. The gadolinium and cobalt sources, either separated or mixed, as required, are introduced into vacuum envelope 9a and an associated R.F. source 9b is energized to provide a radio frequency voltage $V_{RF}$, of the afore-described magnitude, to sputtering means 9c. The alloy-constituent molecules 14' are deposited on surface 12a. Means 9b and 9c are operated until layer 14 is deposited to the required thickness h, typically between 100 Angstroms and 5000 Angstroms, with a thickness h of about 500 Angstroms being preferred. Thereafter, and essentially without breaking the vacuum in isolation means 9a, additional apparatus 9d within means 9a, and forming part of the overall deposition means 9, is utilized to provide a layer 16, of thickness t, of a substantially optically-transparent material upon the free surface 14a of the magnetic media layer. Illustratively, layer 16 is of silicon dioxide, fabricated to a thickness on the order of 1000 Angstroms, by R.F. sputtering beam 16' deposition methods well known to the art. The thickness t of layer 16 is advantageously selected to be about one-quarter wavelength of the light beam being used to read the information (as explained hereinbelow), as corrected for the refractive index of the layer 16 material. Layer 16 serves to protect the magnetic recording layer surface 14a and, if the aforementioned thickness conditions are observed, serves to enhance data readout (which readout is accomplished as hereinbelow explained).

After passivation of the recording layer 14 surface, by layer 16, the recording disk 11 is removed from apparatus 9 and may be stored until information is to be recorded thereon.

Figure 2:
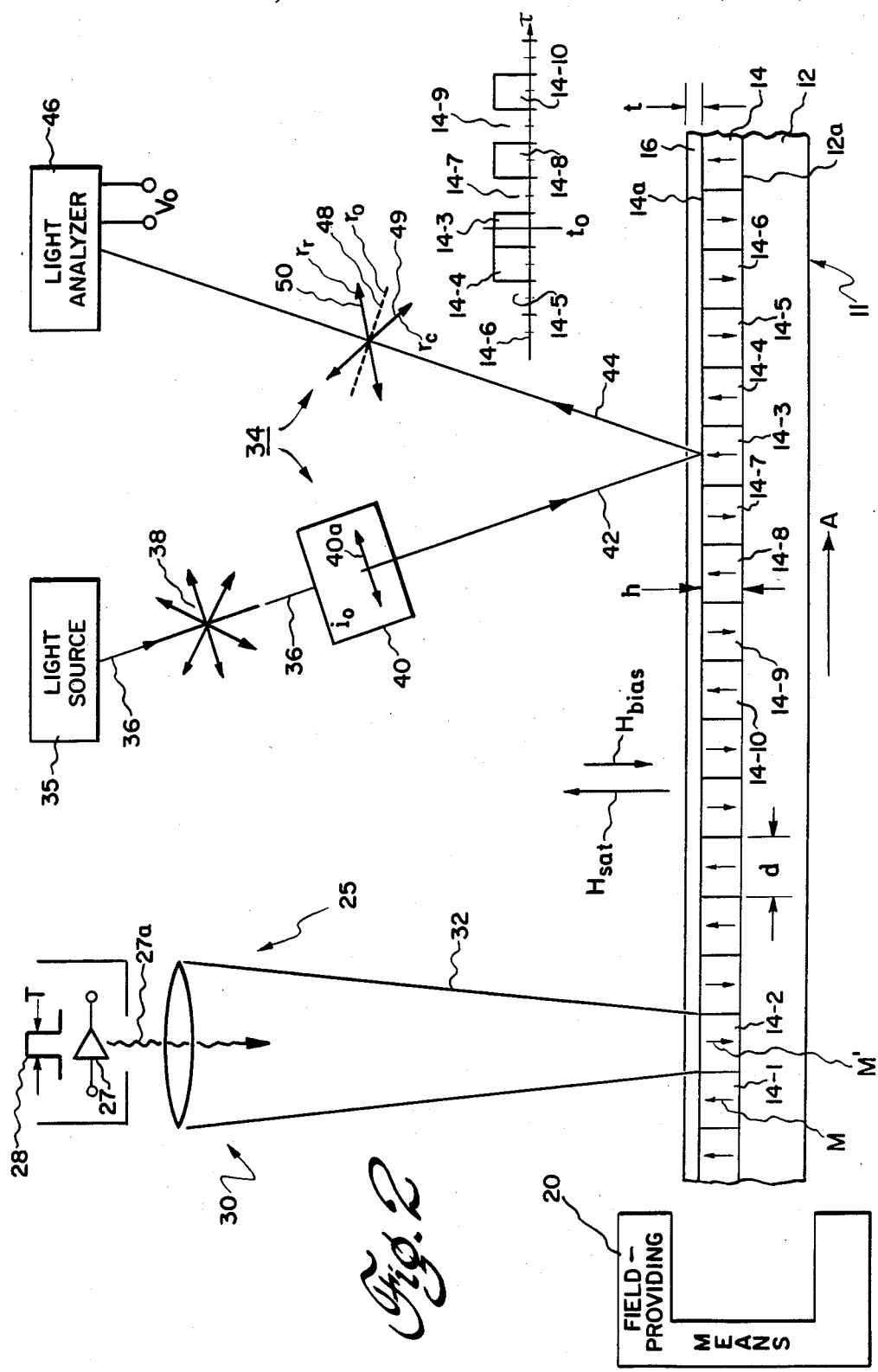
FIG. 2 is a side view of a portion of the magnetic recording disk, illustrating the manner in which information is written into and read out of the disk, and useful in understanding principles of the invention.

FIG. 2 illustrates the method (more fully described and claimed in copending application Ser. No. 493,494, filed on even date herewith, assigned to the assignee of the present application and incorporated herein in its entirety by reference) for recording of binary-coded information on disk 11. Means 20 first subjects the disk to a saturating magnetic field of magnitude $H_{sat}$ and having a first field direction with respect to the recording film surface 12a, e.g. upward, from substrate 12 to protective film 16. Upon removal of the saturation field $H_{sat}$, each domain area 14-N (where $1 \leq N \leq X$ and X is at least 10 in the illustrated embodiment) has a residual magnetic moment M in the direction of saturation field $H_{sat}$. The direction of the M vector establishes a first binary condition, e.g. as in domain 14-1. The remaining binary condition is provided by establishing a magnetization M' of opposite direction (to the direction of the $H_{sat}$) in a particular domain 14-N.

The M' magnetization of a domain, e.g. domain 14-2, is recorded by heating that domain to a temperature less than the melting temperature of the material, e.g. GdCo, of the recording film 14, while subjecting the film to a bias magnetic field $H_{bias}$, which may be provided by the same field-providing means 20. The bias field vector has a direction opposite to the direction of the saturation field $H_{sat}$, and has a magnitude $|H_{bias}|$ less than the saturation magnitude $|H_{sat}|$.

The localized heating of a domain, e.g. domain 14-2, is provided by focusing of light energy thereon from writing source means 25. Means 25 includes a laser diode 27 for emitting a pulsed light beam 27a responsive to an electrical current pulse 28, of pulse width T. The emitted beam is focussed by an optical means 30. The focussed beam 32 is transmitted through the transparent film 16 and impinges on the area of recording film surface 12a defining the desired domain, e.g. domain 14-2. The impingent energy heats that portion of the recording film 12 in the desired domain; the coercive force of the film 12 is reduced below the net magnetic field at the heated site. After the end of the laser pulse, of duration T, the recording film cools to room temperature, in the presence of the net magnetic field. Since the net magnetic field is the result of the film magnetization distribution and the bias field, the magnitude $H_{bias}$ of the bias field can be set to a desired value, e.g. about twice the magnitude of the film coercive force $H_c$, and the cooling domain has a magnetization M' in the direction of the net magnetic field.

The recorded domains having the magnetization M' therein may be erased by a high saturation field $H_{sat}$, which annihilates the domains, if the domains were recorded by heating to a domain temperature from about 100° C. to about 200° C., as might be provided by subjecting each domain, of diameter about 1 micron, to a single optical recording pulse having a duration T from about 20 nanoseconds to about 1 microsecond, to heat a domain area from about one-quarter micrometer-squared to about 2 micrometers-squared. A non-erasable recording with permanent magnetic domains is provided by heating the domain area to a much higher temperature than that needed for providing erasable domains. The permanent recording temperature at each domain must be greater than about 200° C. but less than the melting temperature of the recording film 14. For the same laser beam power, e.g. between about 5 milliwatts and about 15 milli-watts, a single pulse of duration T of about 10 microseconds (or a chain of sequential 1 microsecond pulses) can be utilized with a domain having a diameter d between about 2 microns and about 3 microns, as described and claimed in the aforementioned copending application Ser. No. 493,494.

The non-permanently recorded domains can also be erased individually. Bit domain 14-2 would be erased by reversing the bias field $H_{bias}$ and pulsing the light source 27 for the time T to heat the domain area to about the same temperature as utilized during recording. Because the net magnetic field at bit domain 14-2 is now in the same direction as the original saturating field $H_{sat}$, the magnetization in the bit domain upon cooling will be in the direction M. Since the bias field $H_{bias}$ is well below the saturating field $H_{sat}$, none of the other bit domains that experience this field $H_{bias}$ would be changed since they are not heated by the light source 27.

After recording, the recorded magnetic disk 11 can be stored until read-out of the stored data is desired. The non-permanently recorded disk should be physically stored in an environment devoid of magnetic fields having magnitudes close to, or greater than, the saturation magnitude $H_{sat}$. It should be understood that the non-permanently recorded disk can, after being erased by a saturation field, be re-recorded with information stored in either the non-permanently-recorded or permanently-recorded modes, and that the subsequent permanency of recording will depend upon the temperature to which the domain is subjected during the recording process.

The recorded disk is read by utilization of an effect producing different output results dependent upon the direction of magnetization in each domain 14-N. Incident light can be utilized to read the stored information by an appropriate optical effect e.g. by the use of the Faraday effect for light transmitted through the disk, or by use of the Kerr effect for light reflected from the disk, through transparent layer 16. As previously mentioned, reading of the disk by reflected light (using the Kerr effect) is enhanced by having layer 16 deposited with a quarter-wavelength thickness, as corrected for the refractive index of the layer 16 material. Illustratively, Kerr-effect reading apparatus 34 includes a light source 35 emitting a beam 36 of light having random-polarization vectors 38. Beam 36 is passed through a plane-polarizing means 40 and the resulting beam has a single polarization vector 40a. The plane-polarized beam 42 impinges upon disk 11 and passes through the substantially transparent protective layer 16 thereof. Incident beam 42 is reflected from the thin-film recording layer surface 12a, passes through layer 16 and is transmitted as reflected beam 44 to a light analyzer means 46. Means 46 provides an output voltage $V_0$ in one of two binary states, dependent upon the rotation of polarization in the reflected beam 44, relative to the polarization $i_o$ of the incident beam. The Kerr effect causes the reflected plane of the polarization vector, which would be a complementary planar polarization $r_0$ vector if the reflecting film region were to be unmagnetized, to have either a planar polarization $r_c$ vector 49 rotated in a first direction for reflection from the surface of a magnetized domain having M magnetization therein, or a plane polarization $r_r$ vector 50 rotated in the opposite direction for reflection from the surface of a magnetized domain having the M' magnetization in the opposite direction. If the magnetizations M and M' are of opposite direction and substantially equal magnitudes, the degrees of rotation of vectors 49 and 50 will be substantially equal in the substantially opposite directions.

As illustrated, for a disk traveling in the direction of arrow A, the interrogation beam 42 is, at time $t_0$, reflected from the surface of domain 14-3, having an M magnetization therein; the reflected beam 44 has a rotated polarization $r_c$ vector 49 and the analyzer means provides a logic 1 output responsive to receipt thereof. The previously-interrogated domains 14-4 through 14-6, respectively having the magnetizations M, M' and M' were read, at times $\tau$ immediately prior to time $t_0$, as binary 1, 0 and 0 data bits. Similarly, as the disk continues to turn, beam 42 interrogates domain 14-7 and the M' magnetization therein causes the reflected beam to have the polarization rotation $r_r$ imparted thereto, whereby analyzer means 46 provides a binary 0 output. Similarly, for subsequent positions of the interrogation beam at domains 14-8 through 14-10, for sequential times $\tau$ after time $t_0$, the reflected beam 44 has the respective polarization rotations vectors $r_c$, $r_r$ and $r_c$ and the analyzer means output voltage $V_0$ is respectively in the binary 1, 0 and 1 states responsive thereto.

While presently preferred embodiments have been described in detail herein, many modifications and variations will now become apparent to those skilled in the art. It is my intent, therefore, to be limited only by the scope of the appending claims and not by the details and instrumentalities described by way of explanation of exemplary embodiments herein.

What is claimed is:

1. A thermo-magnetic information recording member, comprising:
    a disk substrate having a susrface; and
    a thin-film recording layer of an amorphous alloy of at least one rare-earth element and at least one transition-metal element, the elements being chosen to minimize domain wall energy per unit area in the resulting alloy; said layer being deposited upon the surface of said substrate with the layer material having a value of Q not less than 1 and not greater than 2, where $Q=K_u/2\pi M^2$, $K_u$ is the uniaxial anisotropy constant and M is the magnetization of the layer material, said layer having a multiplicity of domains therein each stable in the absence of an external bias field.

2. The recording member of claim 1, wherein the resulting alloy has a compensation temperature near room temperature.

3. The recording member of claim 1, wherein said at least one transition-metal element is chosen from the group consisting of iron and cobalt.

4. The recording member of claim 1, wherein said at least one rare-earth element is chosen from the group consisting of gadolinium, dysprosium and terbium.

5. The recording member of claim 4, wherein said at least one transition-metal element is chosen from the group consisting of iron and cobalt 6. The recording member of claim 5, wherein said layer is fabricated of a gadolinum cobalt amorphous alloy.

7. The recording member of claim 5, wherein said layer is fabricated of a gadolinum terbium cobalt amorphous alloy.

8. The recording member of claim 5, wherein said layer is fabricated of a terbium iron amorphous alloy.

9. The recording member of claim 5, wherein said layer is fabricated of a gadolinium terbium iron amorphous alloy.

10. The recording member of claim 1, wherein said thin-film layer has a thickness less than the diameter of magnetic recording domains to be supported by said layer.

11. The recording member of claim 10, wherein said layer has a thickness from about 100 Angstroms to about 5,000 Angstroms.

12. The recording member of claim 11, wherein said layer has a thickness of about 500 Angstroms.

13. The recording member of claim 1, further including a film of a transparent material fabricated upon that surface of said alloy layer furthest from said substrate.

14. The recording member of claim 13, wherein said transparent film has a thickness on the order of 1000 Angstroms.

15. The recording member of claim 13, further comprising: a layer of a reflective material fabricated upon said substrate surface; and another film of a transparent material fabricated upon said reflective layer; said reflective layer and said another transparent film being sandwiched between said substrate and said alloy layer.

* * * * *